United States Patent [19]

Personick

[11] Patent Number: 4,642,804
[45] Date of Patent: Feb. 10, 1987

[54] SHARED LASER LIGHTWAVE TRANSMISSION SYSTEMS

[75] Inventor: Stewart D. Personick, Middletown, N.J.

[73] Assignee: Bell Communications Research, Inc., Livingston, N.J.

[21] Appl. No.: 732,556

[22] Filed: May 10, 1985

[51] Int. Cl.$^4$ ............................................. H04B 9/00
[52] U.S. Cl. ................................. 370/3; 455/605; 455/606; 455/610
[58] Field of Search ............. 455/605, 606, 607, 610, 455/612, 617, 618; 370/3, 1, 2, 4; 350/96.15, 96.16

[56] References Cited

U.S. PATENT DOCUMENTS

| | | | |
|---|---|---|---|
| 2,345,445 | 3/1944 | Atwood | 250/7 |
| 3,532,890 | 10/1970 | Denton | 250/199 |
| 3,584,220 | 6/1971 | Nomura et al. | 250/199 |
| 3,995,155 | 11/1976 | Hutcheson et al. | 250/227 |
| 4,165,225 | 8/1979 | Auracher et al. | 65/4 B |
| 4,195,269 | 3/1980 | Ettenberg et al. | 332/7.51 |
| 4,326,298 | 4/1982 | Fromm et al. | 455/606 |
| 4,525,873 | 6/1985 | Baues | 455/600 |

FOREIGN PATENT DOCUMENTS

| | | | |
|---|---|---|---|
| 0105753 | 4/1984 | European Pat. Off. | 455/612 |
| 53-41104 | 4/1978 | Japan | 455/612 |

OTHER PUBLICATIONS

Ulrich; "Polarization Stabilization on Single Mode Fiber;" in Applied Physics Letters; vol. 35; No. 11; Dec. 1, 1979; pp. 840-842.
Alferness; "Guided-Wave Devices for Optical Communication" in IEEE Journal of Quantum Electronics; vol. QE-17; No. 6, Jun. 1981, pp. 946-959.
Lasertron publication; "Q-DF-T Transimpedance PINFET Detector Module".
General Optronics Corp. publication; "Go-PINFET Specification", 1982.
Lasertron publication on QLM-1300-SM-BH 1300 nm Laser Module with Single Mode Fiber.
"Two-Channel Single-Mode WDM in the 1.3 Micron Wavelength Region" by P. Kaiser, et al. in the Proceedings of the Integrated Optics and Optical Communications Conference in Tokyo at p. 272 in Jun. 1983.
Kishimoto, "Optical Coupler for Laser Redundancy System", Electronic Letters, Jan. 4, 1982, vol. 18, p. 140.
Cheng, et al., "Subscriber Loop Architecture", AT&T Technical Digest, Sep. 1984, No. 75, pp. 9-10.
Gould Electronics Bulletin GD-11, Coupler Specifications—Update, Jun. 1984, Defense Electronics Division.

Primary Examiner—Robert L. Griffin
Assistant Examiner—Andrew J. Telesz, Jr.
Attorney, Agent, or Firm—James W. Falk; Howard R. Popper

[57] ABSTRACT

An optical transmission network for transmitting information between two locations is disclosed. The transmission network comprises a collection of individual two-way links with all optical sources at one end.

At a first location, the outputs of at least two lasers, operating at first and second wavelengths respectively, are multiplexed together, the resulting optical power being divided between a plurality of single mode optical fiber transmission paths. Each optical transmission path may include a wavelength selective modulator for modulating information onto the first wavelength for transmission from the first location to the second location.

At the second location, the wavelengths are separated and the information modulated onto the first wavelength is detected. The second wavelength may be modulated with information to be transmitted back to the first location. No dedicated laser is required at the second location.

10 Claims, 2 Drawing Figures

SHARED LASER LIGHTWAVE TRANSMISSION SYSTEMS

TECHNICAL FIELD

This invention relates to a lightwave transmission system and, more particularly, to a short haul lightwave transmission system which is formed from single mode laser sources and low loss single mode optical fibers.

BACKGROUND OF THE INVENTION

Heretofore, short haul lightwave transmission systems, i.e., those covering distances up to about 10 kilometers, have generally employed directly modulated LEDs in tandem with multimode optical fibers. Such multimode fibers typically have an attenuation of approximately 1-2 dB per kilometer and have relatively little bandwidth (0.5-1 GHz-km). In contrast, long haul light guide transmission systems, i.e., those covering distances of up to about 40 kilometers, employ directly modulated lasers driving single mode optical fibers. Single mode optical fibers typically have a core diameter of about 8 microns, an attenuation of about 0.5 dB per kilometer and nearly unlimited bandwidth (more than 1000 GHz-km). An LED or a laser is directly modulated when the drive current to the LED or laser is directly subjected to the modulating signal.

The single mode optical fiber information carrying capabilities cannot be fully realized when a relatively inexpensive LED serves as the optical power source, because LEDs provide incoherent and multimode emission which limits the achievable power coupling efficiency and limits the useful bandwidth of the link (due to dispersion). The single mode optical fiber works best when a relatively expensive laser operating in a single mode and with a narrow spectral width serves as the optical power source. For this reason relatively inexpensive LEDs are used in combination with relatively high loss and narrow bandwidth multimode fibers in short haul lightwave transmission systems. It has usually not been economical to use relatively expensive directly modulated lasers with single mode fibers in short haul lightwave transmission systems.

One short haul lightwave transmission system in which lasers are used in combination with single mode optical fibers is described in U.S. patent application Ser. No. 680,398 filed on behalf of S. D. Personick and S. S. Cheng and assigned to the assignee hereof. This patent application is incorporated herein by reference. In the system of the aforementioned patent application, all of the power of the laser is not dedicated to a single transmission path, as would follow from the use of a directly modulated laser. Instead, the power output of one or more unmodulated centrally located lasers is divided over a plurality of single mode optical fibers. External modulation is performed after power splitting. When a single laser can be used to supply optical power to a plurality of optical fibers, it begins to make economic sense to use relatively expensive lasers in combination with low loss single mode optical fibers in short haul optical transmission systems.

More particularly, U.S. patent application Ser. No. 680,398 discloses an optical transmission system for transmitting information between a first and a second central office. The optical transmission system includes n individual two way links between the first and second central offices. The two central offices are connected by two sets of n single mode optical fibers, one set for transmitting information from the first central office to the second central office and the other set for transmitting information from the second central office to the first central office. Each of the individual two way links includes one fiber from each of the two sets.

The first central office includes two lasers, one operating at wavelength $\lambda_1$, and the other operating at wavelength $\lambda_2$. The wavelength $\lambda_1$ power output of the first laser is divided into n separate outputs by an n way power divider. The wavelength $\lambda_2$ power output of the second laser is also divided into n separate outputs by an n way power divider. Each of the n wavelength $\lambda_1$ outputs is then modulated with information and wavelength multiplexed with one of the n unmodulated wavelength $\lambda_2$ outputs for transmission from the first central office to the second central office over one of the n optical fibers provided for this purpose.

At the second central office the multiplexed wavelengths are separated. Each of the n fibers used to transmit information from the first central office to the second central office has a demultiplexer associated with it for this purpose. The information modulated on the wavelength $\lambda_1$ radiation is detected while the wavelength $\lambda_2$ radiation is remotely modulated at the second central office. The remotely modulated wavelength $\lambda_2$ radiation is transmitted back to the first central office over one of the second set of n optical fibers provided to transmit information from the second central office to the first central office. No optical power sources are required at the second central office.

Thus a total of n individual two way links are formed between the first central office and the second central office. To form the n links, the first central office requires two n-way power dividers, n wavelength multiplexers, and n modulators. Such a multiplicity of components is both expensive to purchase and difficult to assemble. Accordingly, it is the object of the present invention to develop a short haul optical transmission system using low loss single mode optical fibers in combination with the lasers, which system uses fewer components so that it is less expensive and easier to assemble than the system described above.

SUMMARY OF THE INVENTION

The present invention is an optical transmission network for transmitting information between two locations. The transmission network comprises a collection of individual two way links, with all of the optical power sources at one end. Preferably, the individual two way links are achieved using coherent light sources and single mode optical transmission paths. In contrast to the system described above, the system of the present invention uses fewer components and is thus less expensive and easier to assemble.

More particularly, the first location, for example a central office, comprises first and second lasers operating at first and second wavelength $\lambda_1, \lambda_2$ respectively. The wavelength $\lambda_1$ and wavelength $\lambda_2$ radiations are multiplexed by means of a wavelength multiplexer. The resulting composite radiation is then divided over a first set of n transmission paths connecting the first location to the second location, which transmission paths are preferably single mode optical fiber transmission paths. Each of the transmission paths may include a wavelength selective modulator for modulating wavelength $\lambda_1$ radiation with information to be transmitted from the first location to the second location. The wavelength $\lambda_2$ radiation is unaffected by the wavelength selective modulators.

At the second location the wavelength $\lambda_1$ and wavelength $\lambda_2$ radiation are demultiplexed by means of a demultiplexer associated with each transmission path. The information modulated on the wavelength $\lambda_1$ radiation is detected, while the wavelength $\lambda_2$ radiation is remotely modulated at the second location for transmission back to the first central office over a transmission path from a second set of n transmission paths connecting the two locations. Thus a total of n individual two way links are established. Again, no optical power sources are required at the second location.

By multiplexing the laser outputs before power dividing, and by using wavelength selective modulators, the first location is equipped using one wavelength multiplexer, one power divider, and n modulators. In contrast, when power division and modulation take place before wavelength multiplexing as in the aforementioned patent application, the first location requires two power dividers, n multiplexers and n modulators. Thus the network of the present invention provides a significant savings in the total number of components so that it is both less expensive and easier to assemble.

DETAILED DESCRIPTION

Before describing the optical transmission system of the present invention, it may be helpful to briefly describe the optical transmission system disclosed in U.S. patent application Ser. No. 680,398. This system is schematically illustrated in FIG. 1.

Figure 1:
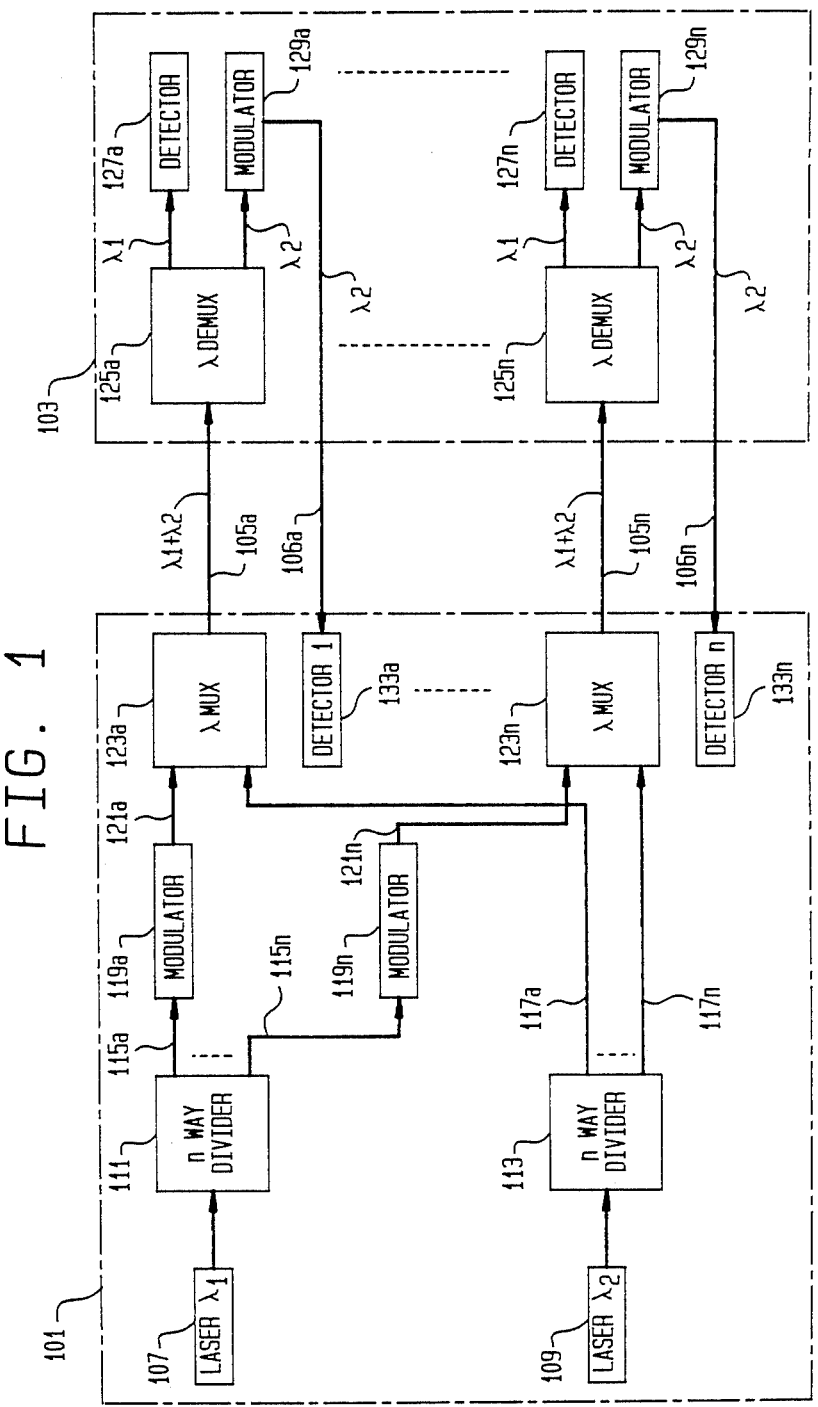
FIG. 1 is a schematic illustration of an optical transmission system of the type disclosed in U.S. patent application Ser. No. 680,398.

The transmission system of FIG. 1 comprises a local central office 101 and a remote central office 103. The central offices 101 and 103 are connected by a plurality of low loss single mode optical fiber transmission paths 105a . . . 105n, 106a . . . 106n. The fibers 105a . . . 105n carry information from central office 101 to central office 103, while the fibers 106a . . . 106n carry information from central office 103 to central office 101. Corresponding pairs of fibers 105a, 106a . . . 105n, 106n form individual two-way links between the central offices 101, 103.

The local central office 101 contains a first single mode CW laser source 107 operating at wavelength $\lambda_1$ and a second single mode CW laser source 109 operating at wavelength $\lambda_2$.

To distribute the power output of laser sources 107, 109 among fibers 105a . . . 105n, the outputs of laser sources 107, 109 are connected to power dividers 111, 113, respectively. The power divider 111 includes a plurality of outputs 115a . . . 115n, each of which receives 1/n of the wavelength $\lambda_1$ power output of laser source 107. Similarly, power divider 113 includes a plurality of outputs 117a . . . 117n, each of which receives 1/n of the wavelength $\lambda_2$ power output of laser source 109.

The wavelength $\lambda_1$ radiation at each of the outputs 115a . . . 115n is modulated by one of the external modulators 119a . . . 119n to produce wavelength $\lambda_1$ modulated outputs 121a . . . 121n. The modulators 119a . . . 119n encode the wavelength $\lambda_1$ outputs with information to be transmitted from local central office 101 to remote central office 103. Each of the modulated wavelength $\lambda_1$ outputs 121a . . . 121n is combined with one of the unmodulated wavelength $\lambda_2$ outputs 117a . . . 117n by means of wavelength multiplexers 123a . . . 123n, for transmission to remote central office 103 over single mode fibers 105a . . . 105n. Thus, the radiation transmitted over each of fibers 105a . . . 105n comprises a modulated $\lambda_1$ component and an unmodulated $\lambda_2$ component.

At the remote central office 103 the composite radiation transmitted over single mode fibers 105a . . . 105n is demultiplexed into $\lambda_1$ radiation and $\lambda_2$ radiation by means of wavelength demultiplexers 125a . . . 125n. One of the demultiplexers 125a . . . 125n is associated with each of the fiber transmission paths 105a . . . 105n. The information modulated onto the wavelength $\lambda_1$ radiation is detected by means of detectors 127a . . . 127n. The wavelength $\lambda_2$ radiation transmitted over each of the fibers 105a . . . 105n is modulated at remote central office 103 by means of modulators 129a . . . 129n, respectively. The modulated wavelength $\lambda_2$ radiation is then transmitted back to local central office 103 by way of single mode fibers 106a . . . 106n. The information modulated onto the wavelength $\lambda_2$ radiation at remote central office 103 is detected by means of detectors 133a . . . 133n at central office 101.

Thus n individual two-way links between central offices 101 and 103 are established with all of the optical sources being located at central office 101. The local central office 101 requires two n-way power dividers, n wavelength multiplexers, and n modulators.

Figure 2:
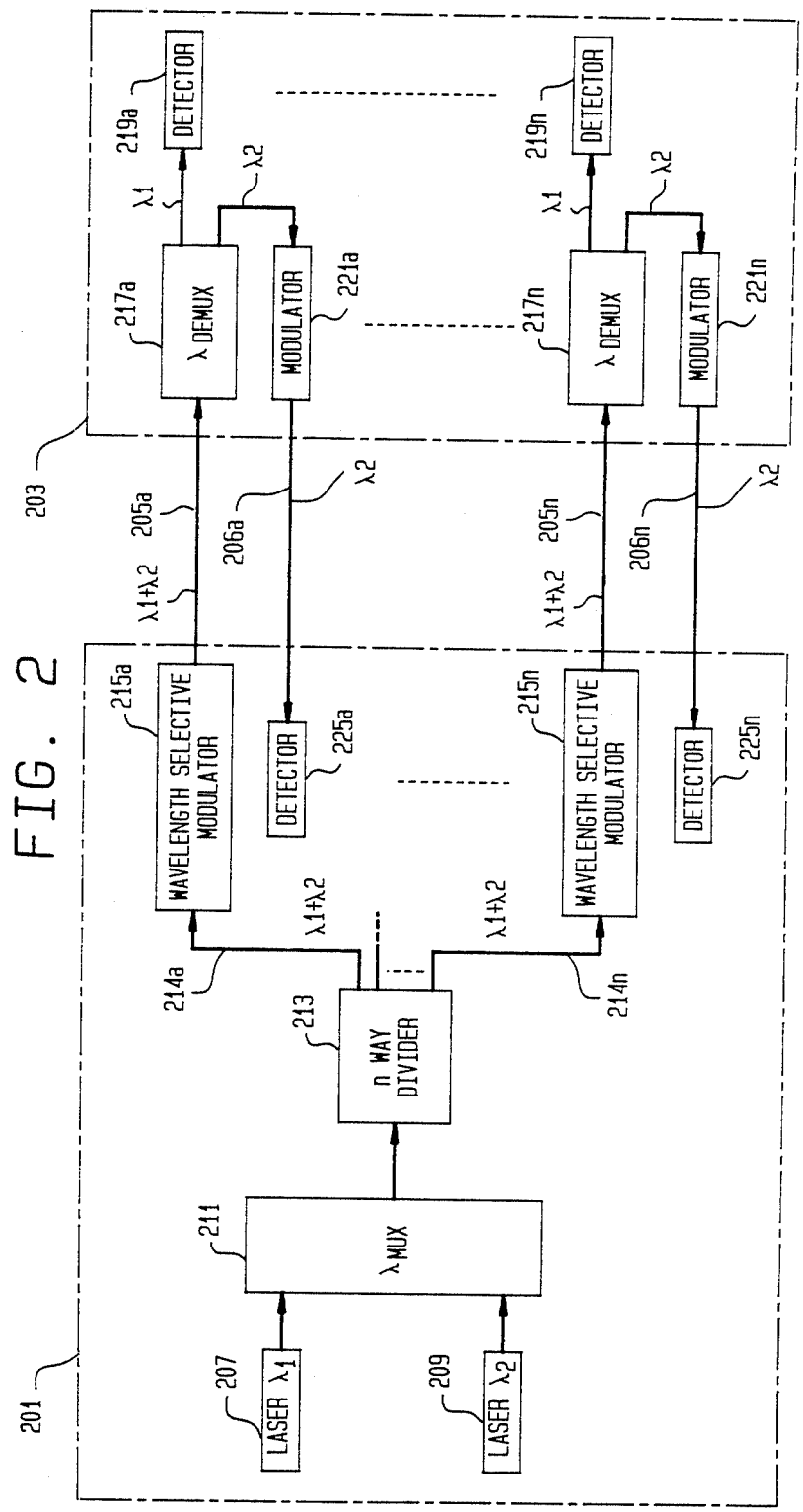
FIG. 2 is a schematic illustration of an optical transmission system in accordance with an illustrative embodiment of the present invention.

Referring to FIG. 2, the optical transmission system of the present invention is schematically illustrated. This system implements n individual two-way links between a local central office and a remote central office with significantly fewer components than the system which has been described above.

The optical transmission system of FIG. 2 comprises a local central office 201 and a remote central office 203. The central offices 201, 203 are connected by means of single mode low loss optical fiber transmission paths 205a . . . 205n, 206a . . . 206n. The fibers 205a . . . 205n serve to transmit information from local central office 201 to remote central office 203. The fibers 206a . . . 206n serve to transmit information from remote central office 203 to local central office 201. Corresponding pairs of fibers 205a, 206a . . . 205n, 206n form the n individual two-way links between the central offices 201 and 203.

Local central office 201 contains a first single mode continuous wave laser source 207 operating at wavelength $\lambda_1$ and a second single mode continuous wave laser source 209 operating at wavelength $\lambda_2$. Illustratively, $\lambda_1$ is 1.3 $\mu$m and $\lambda_2$ is 1.4 $\mu$m. Sources 207 and 209 may advantageously be wavelength stabilized GaInAsP/InP lasers such as the model QLM-1300-SM-BH manufactured by Lasertron Inc., Burlington, Mass.

The outputs of lasers 207, 209 are wavelength multiplexed by wavelength multiplexer 211. The wavelength multiplexer 211 may be of the type described in an article entitled "Two Channel Single Mode WDM in the 1.3 Micron Region" appearing in the Proceedings of the Integrated Optics and Optical Communications Conference held in Tokyo in June 1983 at page 272. The wavelength multiplexer 211 results in composite radiation having a wavelength $\lambda_1$ component and a wavelength $\lambda_2$ component.

The composite radiation produced by the multiplexer 211 is divided over optical fiber transmission paths 205a ... 205n by means of a wavelength independent power divider 213. The power divider 213 illustratively comprises a cascaded arrangement of one fiber input to two fiber output couplers. An illustrative form of a one fiber input to two fiber output coupler is manufactured by Gould, Inc., Defense Electronics Division and described in their Bulletin GD-11.

Each of the optical fiber transmission paths 205a ... 205n includes a wavelength selective modulator 215a ... 215n, respectively. Each of the modulators 215a ... 215n modulates the wavelength $\lambda_1$ radiation being transmitted over one of the fibers 205a ... 205n, while leaving the wavelength $\lambda_2$ radiation in unmodulated form. An illustrative embodiment of a wavelength selective modulator is disclosed in Alferness "Guided Wave Devices for Optical Communications" IEEE Journal of Quantum Electronics QE17-June 1981, pp. 946–959. Thus each of the fibers 205a ... 205n transmits modulated wavelength $\lambda_1$ radiation and unmodulated wavelength $\lambda_2$ radiation between central offices 201, 203.

At the remote central office 203, the composite radiation transmitted over fibers 205a ... 205n is demultiplexed into wavelength $\lambda_1$ radiation and wavelength $\lambda_2$ radiation by means of wavelength demultiplexers 217a ... 217n. An example of such a demultiplexer is described in the aforementioned article entitled "Two Channel Single Mode WDM in the 1.3 Micron Wavelength Region".

At the remote central office 203, the information modulated onto the wavelength $\lambda_1$ radiation is detected by means of detectors 219a ... 219n, while the wavelength $\lambda_2$ radiation is remotely modulated by means of modulators 221a ... 221n. The modulated wavelength $\lambda_2$ radiation is then transmitted back to local central office 201 by way of single mode optical fibers 206a ... 206n. The modulated wavelength $\lambda_2$ radiation transmitted to central office 201 over fibers 206a ... 206n is detected by means of detectors 225a ... 225n.

Thus n individual two-way links have been established between central offices 201 and 203. Note that all of the optical sources are located in central office 201. The central office 201 requires one n-way power divider, one wavelength multiplexer, and n modulators. As indicated above, the system of FIG. 2 uses fewer components than the system of FIG. 1 and thus the system of FIG. 2 is both less expensive and easier to assemble than the system of FIG. 1.

Finally, the above described embodiments of the invention are intended to be illustrative only. Numerous alternative embodiments may be devised by those skilled in the art without departing from the spirit and scope of the claims which follow.

What is claimed is:

1. An optical transmission network comprising
   (a) a first coherent light source for emitting radiation at a first wavelength $\lambda_1$,
   (b) a second coherent light source for emitting radiation at a second wavelength $\lambda_2$,
   (c) a wavelength multiplexer for receiving wavelength $\lambda_1$ radiation from said first light source and wavelength $\lambda_2$ radiation from said second light source, said wavelength multiplexer being adapted to output multiplexed radiation comprising a wavelength $\lambda_1$ component and a wavelength $\lambda_2$ component,
   (d) power dividing means for distributing an aliquot portion of said multiplexed radiation over each of a plurality of transmission paths, and
   (e) wavelength selective modulator means incorporated in at least one of said transmission paths for modulating information onto the $\lambda_1$ component of said multiplexed radiation transmitted over said one transmission path.

2. The optical transmission network of claim 1, wherein said network further comprises,
   demultiplexing means for separating said multiplexed radiation transmitted over said one transmission path into said wavelength $\lambda_1$ and wavelength $\lambda_2$ components, and
   detector means for detecting the information modulated into said wavelength $\lambda_1$ component.

3. The optical transmission network of claim 1 wherein said transmission paths are single mode optical fibers.

4. The optical transmission network of claim 1 wherein said first and second light sources are lasers capable of continuous wave single mode operation.

5. An optical transmission network comprising
   a first central office,
   a second central office,
   a first plurality of single mode optical fiber transmission paths for transmitting information from said first central office to said second central office, and
   a second plurality of single mode optical fiber transmission paths for transmitting information from said second central office to said first central office,
   said first central office comprising
   a first coherent light source for emitting radiation at a first wavelength $\lambda_1$ and a second coherent light source for emitting radiation at a second wavelength $\lambda_2$,
   a wavelength multiplexer for receiving said wavelength $\lambda_1$ radiation from said first source and said wavelength $\lambda_2$ radiation from said second source, said wavelength multiplexer being adapted to produce multiplexed radiation comprising wavelength $\lambda_1$ and wavelength $\lambda_2$ components,
   dividing means for dividing said multiplexed radiation over said first plurality of optical fiber transmission paths, and
   wavelength selective modulating means incorporated in each of said first plurality of optical fiber transmission paths, each of said wavelength selective modulating means being adapted to modulate information onto the wavelength $\lambda_1$ component of said multiplexed radiation, while transmitting the wavelength $\lambda_2$ component without modulation
   said second central office comprising,
   wavelength demultiplexing means coupled to each of said first plurality of optical fiber transmission paths for separating said multiplexed radiation transmitted over each of said first plurality of optical fiber transmission paths into said wavelength $\lambda_1$ radiation and said wavelength $\lambda_2$ radiation,
   detector means for detecting said information modulated onto said wavelength $\lambda_1$ radiation, and
   modulating means for modulating information onto said wavelength $\lambda_2$ radiation, said modulated wavelength $\lambda_2$ radiation being transmitted from said second central office to said first central office by means of said second plurality of optical fiber transmission paths.

6. The transmission network of claim 5 wherein said first central office comprises detector means for detecting information modulated on said $\lambda_2$ wavelength radiation at said second central office.

7. A method for transmitting information over an optical transmission network comprising the steps of
   (a) generating radiation at a first wavelength $\lambda_1$,
   (b) generating radiation at a second wavelength $\lambda_2$,
   (c) multiplexing said radiation at said first wavelength $\lambda_1$ with said radiation at said second wavelength $\lambda_2$ to form composite radiation, said composite radiation having a wavelength $\lambda_1$ component and a wavelength $\lambda_2$ component,
   (d) distributing an aliquot portion of said composite radiation over each of a plurality of separate single mode transmission paths, and
   (e) modulating information onto the wavelength $\lambda_1$ component of said composite radiation in at least one of said transmission paths.

8. The method of claim 7 wherein said method further comprises the steps of
   demultiplexing said composite radiation transmitted over said one transmission path into said wavelength $\lambda_1$ component and said wavelengths $\lambda_2$ component, and detecting the information modulated onto said wavelength $\lambda_1$ component.

9. The method of claim 8 wherein
   following said demultiplexing step information is modulated onto said $\lambda_2$ component.

10. An optical transmission network comprising
    (a) a first coherent light source for emitting radiation at a first wavelength $\lambda_1$,
    (b) a second coherent light source for emitting radiation at a second wavelength $\lambda_2$,
    (c) a wavelength multiplexer for receiving wavelength $\lambda_1$ radiation from said first light source and wavelength $\lambda_2$ radiation from said second light source, said wavelength multiplexer being adapted to output multiplexed radiation comprising a wavelength $\lambda_1$ component and a wavelength $\lambda_2$ component,
    (d) a plurality of single mode optical fiber transmission paths,
    (e) power dividing means for distributing said multiplexed radiation over each of said plurality of transmission paths, and
    (f) wavelength selective modulator means incorporated in at least one of said transmission paths for modulating information onto the $\lambda_1$ component of said multiplexed radiation transmitted over said one transmission path.

* * * * *